United States Patent
LeMaster et al.

(10) Patent No.: US 11,485,476 B2
(45) Date of Patent: Nov. 1, 2022

(54) DRIVELINE TORQUE MONITORING FOR LONG-TERM HEALTH ASSESSMENT

(71) Applicant: Hamilton Sundstrand Corporation, Charlotte, NC (US)

(72) Inventors: Justin LeMaster, Rockford, IL (US); Gregory T. Wallen, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 424 days.

(21) Appl. No.: 16/663,812

(22) Filed: Oct. 25, 2019

(65) Prior Publication Data
US 2021/0122457 A1    Apr. 29, 2021

(51) Int. Cl.
| | |
|---|---|
| *B64C 9/04* | (2006.01) |
| *H02K 11/24* | (2016.01) |
| *B64D 45/00* | (2006.01) |
| *G07C 5/00* | (2006.01) |

(52) U.S. Cl.
CPC .............. *B64C 9/04* (2013.01); *B64D 45/00* (2013.01); *G07C 5/006* (2013.01); *H02K 11/24* (2016.01); *B64D 2045/0085* (2013.01)

(58) Field of Classification Search
USPC ........................................ 701/34.4
See application file for complete search history.

(56) References Cited

U.S. PATENT DOCUMENTS

| | | | |
|---|---|---|---|
| 5,686,907 A * | 11/1997 | Bedell | B64D 45/0005 324/207.13 |
| 7,114,601 B2 | 10/2006 | Mayer et al. | |
| 7,307,415 B2 | 12/2007 | Seger et al. | |
| 7,458,277 B2 | 12/2008 | Discenzo | |
| 8,036,783 B2 | 10/2011 | Pohl | |
| 8,314,518 B2 | 11/2012 | Hors et al. | |
| 9,026,378 B2 | 5/2015 | Fericean et al. | |
| 9,459,088 B2 * | 10/2016 | Ottewill | G01R 31/343 |
| 2014/0015520 A1 | 1/2014 | Kunjappan et al. | |
| 2016/0181961 A1 * | 6/2016 | Holmburg | H02P 21/14 318/400.02 |
| 2019/0061531 A1 | 2/2019 | Harrington et al. | |
| 2019/0063508 A1 * | 2/2019 | Harrington | F16D 7/08 |
| 2019/0308718 A1 | 10/2019 | Jones et al. | |

(Continued)

FOREIGN PATENT DOCUMENTS

| | | |
|---|---|---|
| CN | 108216592 A | 6/2018 |
| EP | 2695810 A1 | 2/2014 |
| EP | 3078596 A1 * | 2/2016 |

(Continued)

OTHER PUBLICATIONS

Turck QR24: IP69K encoder; see attached (Year: 2013).*
Extended European Search Report for EP Application No. 19212050.9, dated Apr. 26, 2020, pp. 1-9.

*Primary Examiner* — Maceeh Anwari
(74) *Attorney, Agent, or Firm* — Cantor Colburn LLP

(57) ABSTRACT

A method of monitoring a power drive unit installed on an aircraft is provided. The method includes causing, by a controller, sensors to measure an angular position at corresponding locations along at least one wing of the aircraft. The controller, as part of the method, receives the angular position from the one or more sensors and analyzes the angular position to generate feedback information to implement the monitoring of the power drive unit.

16 Claims, 3 Drawing Sheets

(56) References Cited

U.S. PATENT DOCUMENTS

2020/0116580 A1* 4/2020 Appleton ................ G01L 3/101

FOREIGN PATENT DOCUMENTS

| EP | 3012191 A1 | 4/2016 |
| EP | 3078596 A1 | 10/2016 |
| EP | 3459858 A1 * | 9/2018 |
| EP | 3459858 A1 | 3/2019 |
| WO | 2019100149 A1 | 5/2019 |

* cited by examiner

DRIVELINE TORQUE MONITORING FOR LONG-TERM HEALTH ASSESSMENT

BACKGROUND

Exemplary embodiments pertain to slat/flap control systems used on aircrafts. In general, these slat/flap control systems do not have provisions for continuous electronic monitoring of driveline torque outboard of a power drive unit (PDU) of an aircraft or throughout a whole driveline of the aircraft. In some cases, passive torque limiters may be installed in actuators of the slat/flap control system or the driveline. Yet, the passive torque limiters only trip if exceeding a pre-defined value (e.g., a torque limit). Thus, torque values below the torque limit and exact magnitudes of jam torque for a torque limiter trip are not known to the slat/flap control system.

BRIEF DESCRIPTION

In accordance with one or more embodiments, a method of monitoring a power drive unit installed on an aircraft is provided. The method includes causing, by a controller, sensors to measure an angular position at corresponding locations along at least one wing of the aircraft. The controller, as part of the method, receives the angular position from the one or more sensors and analyzes the angular position to generate feedback information to implement the monitoring of the power drive unit.

In accordance with one or more embodiments or the method embodiment above, the angular position can be detected based on phase differences for torque of the power drive unit.

In accordance with one or more embodiments or any of the method embodiments above, the angular position can be measured in real-time.

In accordance with one or more embodiments or any of the method embodiments above, the one or more sensors can include non-contact inductive encoders that measures relative angular position and torque by measuring a phase shift between two resolvers.

In accordance with one or more embodiments or any of the method embodiments above, the monitoring of the power drive unit power drive unit can occur in real-time during operations of the power drive unit that provide torque to one or more actuators of a driveline of rotating shafts, which in turn move panels on leading and trailing edges of the at least one wing of the aircraft.

In accordance with one or more embodiments or any of the method embodiments above, the controller can detect maintenance needs of the power drive unit based on the feedback information.

In accordance with one or more embodiments or any of the method embodiments above, the monitoring of the power drive unit can include comparing calculate torques based on the angular position.

In accordance with one or more embodiments or any of the method embodiments above, the monitoring of the power drive unit can include linking the feedback information to various phases of a flight cycle.

In accordance with one or more embodiments or any of the method embodiments above, the controller can cause the one or more sensors to measure a temperature at the one or more corresponding locations, can receive the temperature from the one or more sensors, and can analyze the angular position and the temperature to generate the feedback information to implement the monitoring of the power drive unit.

Any of the above method embodiments can be implemented as a system, computer program product, or an apparatus.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments herein incorporate driveline inductive encoders and a distributed system of nodes along a driveline to determine/measure torques with respect to a slat/flap control system. The technical effects and benefits of the embodiments herein enable torque measurements to be used for diagnosing a location of a driveline disconnect, as well as for monitoring the torques in real-time. Torque and temperature measurements can also be captured and used to monitor torque trends at different temperatures to observe/identify anomalies (e.g., in support of development testing and characterizations of expected torques at various temperatures). In addition, technical effects and benefits of the embodiments herein support development testing and characterization of expected driveline torques at different temperatures (e.g., indicative of flight cycle phases), such that the passive torque limiters can possibly be removed to reduce weight and costs.

Figure 1:
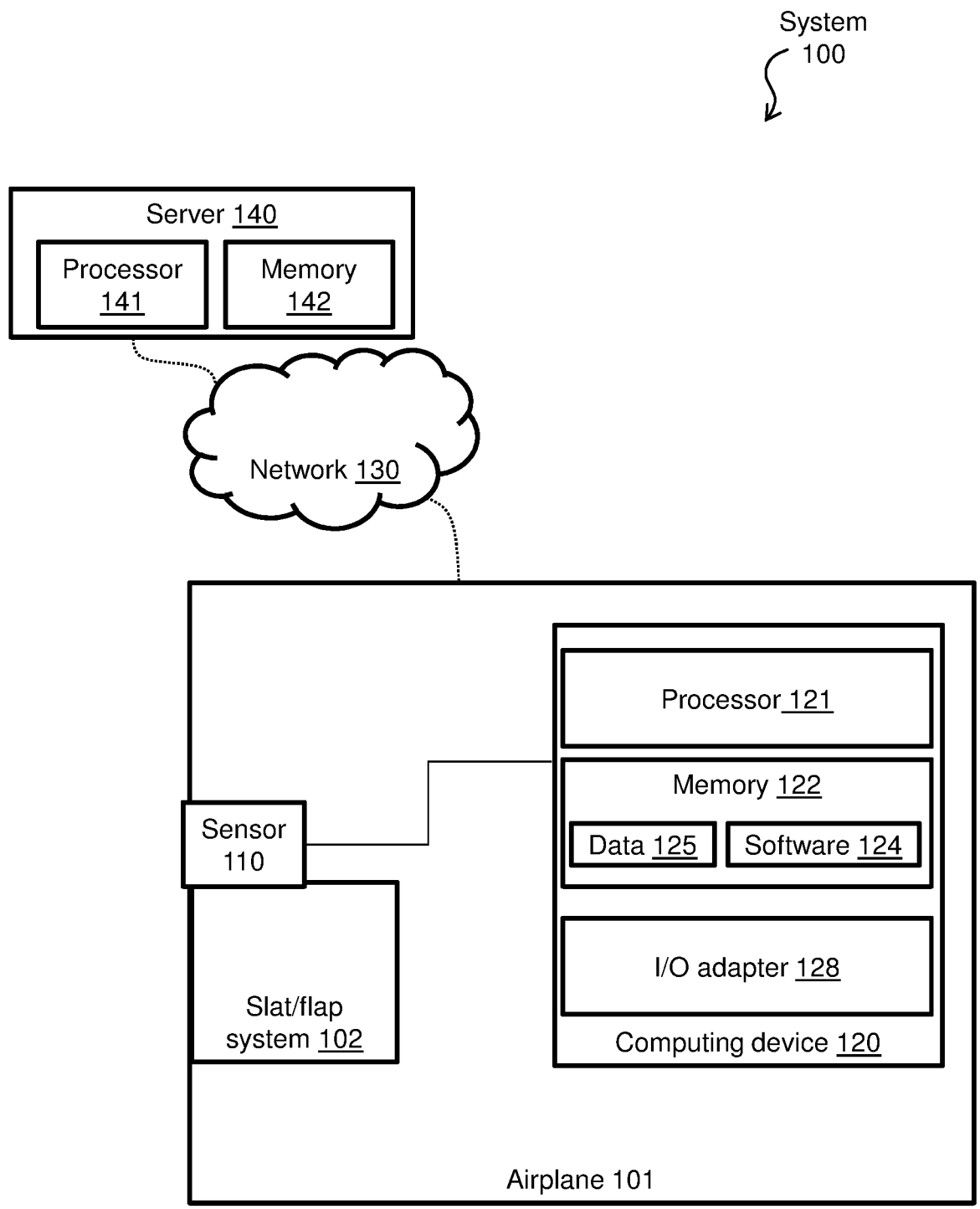
FIG. 1 depicts a system in accordance with one or more embodiments.

FIG. 1 depicts a system 100 for implementing the teachings herein in accordance with one or more embodiments. The system 100 is installed on an aircraft 101. The aircraft 101 can be any machine capable of flight. Examples of the aircraft 101 include, but are not limited to, airplanes, helicopters, gliders, and drones, whether manned or unmanned vehicles. The aircraft 101 can include a slat/flap control system 102 integrated therein. The slat/flap control system 102 includes a power drive unit, a driveline of rotating shafts, and panels. The panels can be on leading and trailing edges of aircraft wings (e.g., slats and flaps) that move in accordance with the driveline of rotating shafts, which receive torque from the power drive unit 2.

A portion of the system 100 that is installed on the aircraft 101 includes one or more sensors 110 (e.g., generally referred to in the singular as the sensor 110) and one or more computing devices 120 (e.g., generally referred to in the singular as the computing device 120). The one or more sensors 110 can be placed in a node arrangement with any number of sensing nodes being employed. Note that the number of sensing nodes is adjustable based on a layout of the slat/flap control system 102.

The sensor 110 can be any transducer or combination of transducers capable of converting environmental activity and/or conditions into electrical signals. Examples of the sensor 110 include, but are not limited to, thermocouples, position devices, inductive sensors, accelerometers, visual-light cameras, strain gauges, and microphones.

The computing device 120 has a processor 121, which can include one or more central processing units (CPUs). The processor 121, also referred to as a processing circuit, microprocessor, computing unit, can be coupled via a system bus to a system memory 122 and various other components. The system memory 122 can include a read only memory (ROM) and/or a random access memory (RAM).

The system memory 122 is an example of a tangible storage medium readable executable by the processor 121. The system memory 122 stores software 124 and data 125. The software 124 is stored as instructions for execution on the system 100 by the processor 121 (to perform process, such as the process flows of FIG. 3).

The software 124 can include code for monitoring torque trends over time (e.g., long-term health monitoring) and/or for detecting anomalies during a given flight cycle. For example, the software 124 can provide real-time torque measurement and health monitoring for torque trends over life and temperature ranges for specific hardware or electronic architectures that are required to implement the slat/flap control system 102.

The data 125 includes a set of values of qualitative or quantitative variables organized in various data structures to support and be used by operations of the software 121. Examples of the data 125 include, but are not limited to, angular position, temperature, and feedback information. Thus, as configured in FIG. 1, the operations of the software 124 and the data 125 are necessarily rooted in the computational ability of the processor 121 to overcome and address the herein-described shortcomings of the slat/flap control systems. In this regard, the software 124 and the data 25 improve computational operations of the processor 121 of the system 100 by enabling a torque and a driveline temperature to be detected and used for diagnosing a location of a driveline disconnect, as well as for enabling a monitoring of the torque in real-time and detecting torque trends at different temperatures to observe/identify anomalies (thereby increasing efficiency of the system 100).

The computing device 120 includes one or more adapters 128 (e.g., generally referred to in the singular as the adapter 128) that interconnect and support communications between the processor 121, the system memory 122, and other components of the system 100 (e.g., the sensor 110). Examples of the adapter 128 include, but are not limited to, hard disk controllers, network adapters, communications adapter, graphics adapters, interface adapters, and display adapter.

The computing device 120 can interconnect through a network 130 with other systems, devices, data, and software, such as a server 140. The network 130 can be any type of communication environment providing physical, electronic, and virtual connections therein. The network 130 can include one or more of a local area network (LAN), a wide area network (WAN), a wireless network, a telecommunication network, and the Internet. Like the computing device 120, the server includes a processor 141 and a memory 142 (as described here). In one or more embodiments of the present invention, the operations of the software 124 and the data 125 can be implemented on the network 130 by the server 140. For instance, the network 130 and the server 140 can combine to provide internal iterations of the software 124 and the data 125 as a platform as a service, a software as a service, and/or infrastructure as a service (e.g., as a web application in a distributed system).

Figure 2:
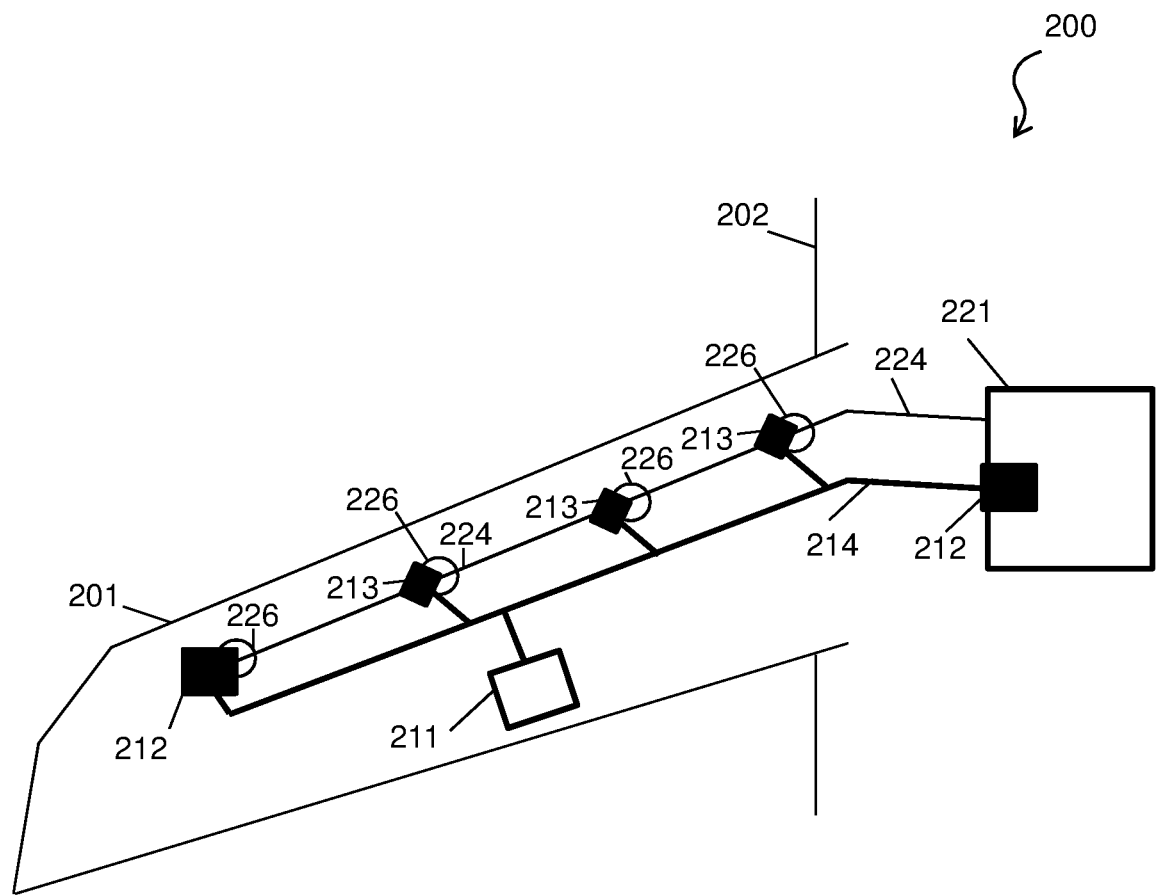
FIG. 2 depicts a system in accordance with one or more embodiments.

FIG. 2 depicts a system 200 in accordance with one or more embodiments. The system 200 that is installed along at least one wing 201 extending from a fuselage 202 (e.g., of the aircraft 101, with the slat/flap control system 102 integrated therein). The system 200 includes a controller 211 (e.g., the computing device 120), one or more sensors 212 and 213 (e.g., the sensor 110), and wiring 214. The system 200 also includes a power drive unit 221, a driveline of rotating shafts 224 (e.g., of the slat/flap control system 102), one or more actuators 226. The power drive unit 221 provides torque to the one or more actuators 226 of the driveline of rotating shafts 224, which in turn move panels on the leading and trailing edges of the at least one wing 201.

The one or more sensors 212 and 213 are sensing nodes spaced along the at least one wing 201 to detect and output torques and driveline temperatures (e.g., torque and temperature measurements) to the controller 211. In accordance with one or more embodiments, the sensors 212 acquire at least one temperature input (e.g., a first driveline temperature for measuring skin temperature of a corresponding actuator 226) at least one torque input (e.g., first and second torques on each side of the corresponding actuator 226). The sensors 213 acquire at least one temperature input (e.g., a second driveline temperature for measuring skin temperature of the corresponding actuator 226) at least one torque input (e.g., a third torque of the corresponding actuator 226).

In accordance with one or more embodiments, the one or more sensors 212 and 213 can be a non-contact inductive encoder that measures relative angular position and torque (e.g., by measuring a phase shift between two resolvers having a sine output). Different non-contact inductive encoders include different mounting options and sizes that do not require motion to accurately report angular position. Non-contact inductive encoders can be manufactured up to several million counts per revolution for high-resolution angle/torque measurement. In some embodiments, the non-contact inductive encoder can be a semi-wireless device where no wires are going to a rotor and one or more wires are going to a stator thereby offering distinct advantages over both wireless and wired sensors.

Further, each sensor 21 and 213 can include a pair of inductive encoders paired with sensors at a distal end of an outboard torque tubes of the corresponding actuator 226 on each side. A mounting flange extending outboard of a housing of the power drive unit 221 can be employed to allow a stator inductive encoder to be mounted close to rotor inductive encoder. In other embodiments, a fixed (stator) portion can be added onto the housing, and/or a moving (rotor) portion can be added onto rotating portion of shaft of torque tube.

In this way, the one or more sensors 212 and 213 can use a stationary element and a rotary element mounted nearby, where the stator/rotor combination gives a sine output to report position. The technical effects and benefits of the one or more sensors 212 and 213 include providing an increased reliability and improved maintenance, as battery concerns (e.g., battery life/power and thermal runway explosion) with respect to wireless strain gauges are eliminated, size and wear concerns (e.g., wear from friction against the rotating driveline) with respect to slip ring torque sensors are eliminated, and rotating wired connections of strain gauges are eliminated. Note also that because the amount of free space is limited on the at least one wing, non-contact inductive encoder can be used over alternative sensors that are bulky and/or heavy. Non-contact inductive encoders can, thus, provide cost savings by removing current skew sensors.

The controller 211 (e.g., a computing device 120) utilizes the torque and temperature measurements for monitoring trends at an output of the power drive unit 221 output and to indicate if/when maintenance may be needed for the system 200. The controller 211 can receive the torque and temperature measurements from the one or more sensors 212 and 213 via the wiring 214 (e.g., installation of electric wiring supporting communications between the sensors 212 and 213 and the controller 211).

Figure 3:
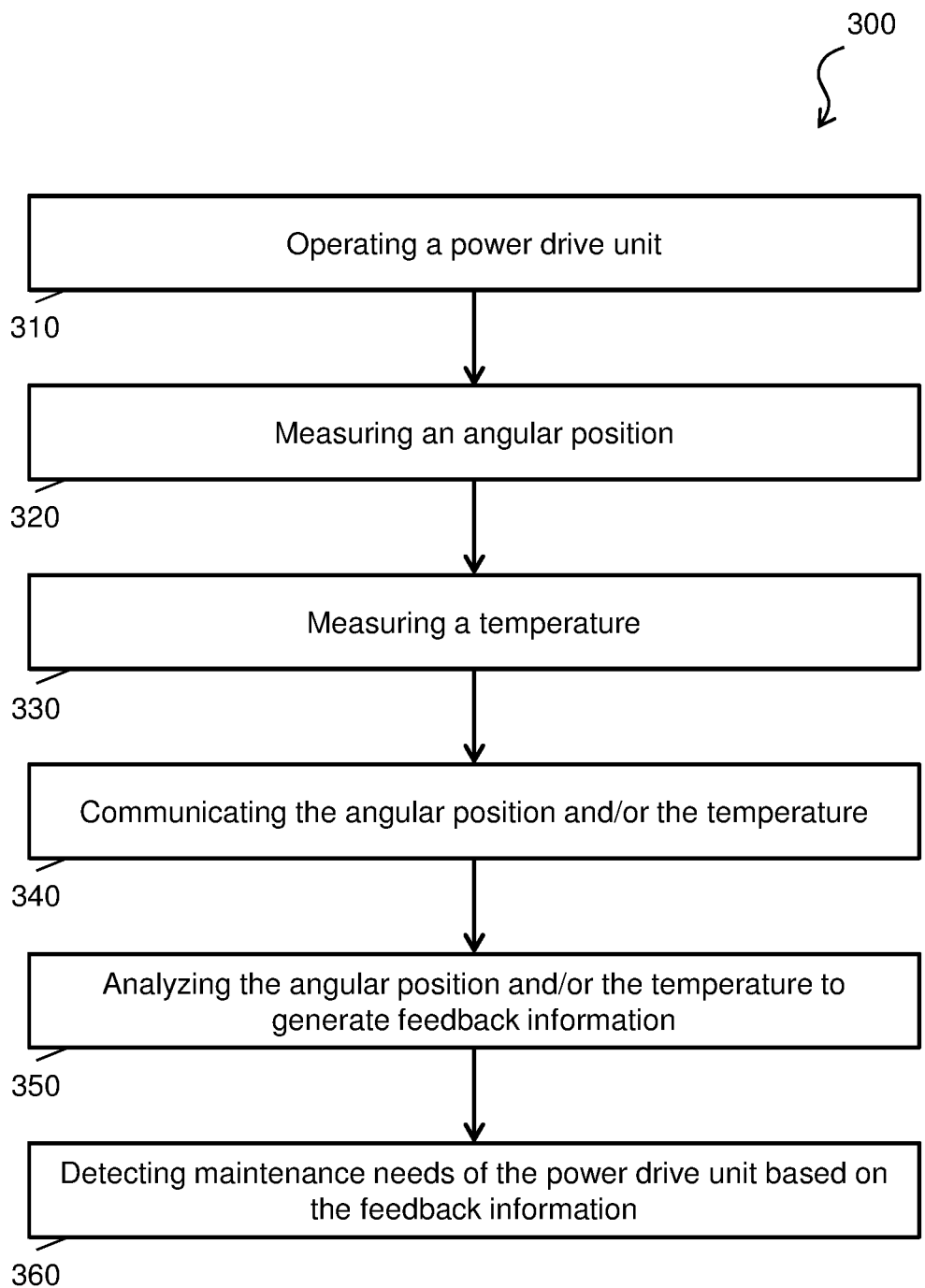
FIG. 3 depicts a process flow in accordance with one or more embodiments.

Turning now to FIG. 3, a process flow 300 is depicted in accordance with one or more embodiments. The process flow 300 is an example operation of monitoring the power drive unit 221 by the system 200. The process flow 300 begins at block 310, where the power drive unit 221 operates. In this regard, the power drive unit 221 provides torque to the one or more actuators 226 of the driveline of rotating shafts 224, which in turn move panels on the leading and trailing edges of the at least one wing 201.

At block 320, the one or more sensors 212 and 213 measure an angular position. The controller 211, by sending command communications across the wring 214, can cause the one or more sensors 212 and 213 to measure the angular position at one or more corresponding locations along the at least one wing 201. The angular position can be detected by detecting sinusoidal outputs of the one or more sensors 212 and 213 (e.g., of the inductive encoders). Torque of the power drive unit 221 and/or the one or more actuators 226 is calculated by measuring phase shift between the sinusoidal outputs (e.g., of the inboard and outboard inductive encoders). The angular position can be measured in real-time, so that real-time torque measurements can be calculated by the controller 211, which is in contrast to having passive torque limiters trip on a set torque value.

At block 330, the one or more sensors 212 and 213 measure a temperature. The controller 211, by sending command communications across the wring 214, can cause the one or more sensors 212 and 213 to measure the temperature at one or more corresponding locations along the at least one wing 201. The temperature can be detected be each of the one or more sensors 212 and 213 at a corresponding node location. The temperature can be measured in real-time, so that real-time temperature measurements can be associated with the real-time torque measurements by the controller 211.

At block 340, the one or more sensors 212 and 213 communicate the angular position and the temperature, as measurements, to the controller 211. The controller 211 can receive the measurements from the one or more sensors 212 and 213 via the wiring 214.

At block 350, the controller 211 analyzes the angular position and the temperature (e.g., measured data) to generate feedback information. The feedback information generated from the measured data provides the controller 211 with the underlying data to detect maintenance needs and to support developing more robust designs for next-generation systems. For instance, by measuring angular position with inductive encoder/node stations at multiple locations of the at least one wing 201, the system 200 (e.g., the controller 211) can calculate torques for various torque shafts to get torque monitoring at various points in the driveline of rotating shafts 224. Further, by measuring temperatures, the system 200 (e.g., the controller 211) can enable torque monitoring at different temperatures and can link this monitoring to various phases of a flight cycle (e.g., taxing, idling, take-off, landing, cruising, etc.). For instance, the temperatures can define groups with the feedback information that the angular positions can be placed in, such that a single temperature range can define a flight cycle phase. Thus, temperature data could be used for new designs or optimization of existing designs, as actual temperatures seen by the system 200 during flight operations would be recorded.

At block 360, the controller 211 detects maintenance needs of the power drive unit 221 based on the feedback information. For example, in an event of a disconnect of the driveline of rotating shafts 224, relative position measurements on opposite sides of an actuator 226 can be used to diagnose a location of the disconnect. At present, in current slat/flap control systems, a disconnect cannot be isolated to a location.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a power drive unit installed on an aircraft, the method comprising:
   obtaining, by a controller, based on two or more sensors arranged at two or more positions along a driveline, angular positions of the driveline at two or more corresponding locations along at least one wing of the aircraft;
   analyzing, by the controller, the angular positions to generate feedback information including relative torque experienced by the driveline among the two or more locations to implement the monitoring of the power drive unit; and
   controlling the driveline, based on the feedback information, to operate panels of the aircraft wherein the angular positions are measured in real-time.

2. The method of claim 1, wherein the obtaining the angular positions is based on detecting phase differences in sine waves obtained with the two or more sensors based on an applied torque by the power drive unit.

3. The method of claim 2, wherein the two or more sensors include non-contact inductive encoders that measure relative angular position and torque by measuring a phase shift between two resolvers.

4. The method of claim 1, wherein the monitoring of the power drive unit occurs in real-time during operations of the power drive unit to provide torque to one or more actuators of a driveline of rotating shafts, which in turn move the panels on leading and trailing edges of the at least one wing of the aircraft.

5. The method of claim 1, wherein the controller detects maintenance needs of the power drive unit based on the feedback information.

6. The method of claim 1, wherein the monitoring of the power drive unit includes determining the relative torque experienced by the driveline among the two or more locations by comparing torques computed based on the angular positions.

7. The method of claim 1, wherein the monitoring of the power drive unit includes linking the feedback information to various phases of a flight cycle.

8. The method of claim 1, wherein the obtaining includes the controller obtaining temperature measurements from one or more of the two or more sensors and the analyzing includes analyzing the temperature measurements in addition to the relative torque to generate the feedback information to implement the monitoring of the power drive unit.

9. A system comprising:
a power drive unit installed on an aircraft;
a controller;
two or more sensors, wherein the system monitors the power drive unit by:
obtaining, based on the two or more sensors arranged at two or more positions along a driveline, angular positions of the driveline at two or more corresponding locations along at least one wing of the aircraft,
analyzing, by the controller, the angular positions to generate feedback information including relative torque experienced by the driveline among the two or more locations to implement the monitoring of the power drive unit, and wherein the system controls the driveline based on the feedback information to operate panels of the aircraft wherein the angular positions are measured in real-time.

10. The system of claim 9, wherein the two or more sensors obtain the angular positions based on phase differences in sine waves obtained with the two or more sensors based on an applied torque by the power drive unit.

11. The system of claim 10, wherein the two or more sensors include non-contact inductive encoders that measure relative angular position and torque by measuring a phase shift between two resolvers.

12. The system of claim 9, wherein the monitoring of the power drive unit occurs in real-time during operations of the power drive unit to provide torque to one or more actuators of a driveline of rotating shafts, which in turn move the panels on leading and trailing edges of the at least one wing of the aircraft.

13. The system of claim 9, wherein the controller detects maintenance needs of the power drive unit based on the feedback information.

14. The system of claim 9, wherein the monitoring of the power drive unit includes determining the relative torque experienced by the driveline among the two or more locations by comparing torques computed based on the angular positions.

15. The system of claim 9, wherein the monitoring of the power drive unit includes linking the feedback information to various phases of a flight cycle.

16. The system of claim 9, wherein one or more of the two or more sensors provide temperature measurements to the controller and the controller analyzes the temperature measurements in addition to the relative torque to generate the feedback information to implement the monitoring of the power drive unit.

* * * * *